Dec. 28, 1965   H. F. McNENNY   3,226,103
FLUID SPRING AND SHOCK ABSORBER
Filed Oct. 29, 1963   3 Sheets-Sheet 1

INVENTOR.
HAROLD F. McNENNY
BY
RICHEY, McNENNY & FARRINGTON
Donald W. Farrington
ATTORNEYS Dec. 28, 1965  H. F. McNENNY  3,226,103
FLUID SPRING AND SHOCK ABSORBER
Filed Oct. 29, 1963  3 Sheets-Sheet 2

INVENTOR.
HAROLD F. McNENNY
BY
RICHEY, McNENNY & FARRINGTON
Donald W. Farrington
ATTORNEYS United States Patent Office
3,226,103
Patented Dec. 28, 1965

3,226,103
FLUID SPRING AND SHOCK ABSORBER
Harold F. McNenny, 11820 Edgewater Drive,
Lakewood, Ohio
Filed Oct. 29, 1963, Ser. No. 319,818
7 Claims. (Cl. 267—64)

This invention relates generally to vehicle suspension systems and more particularly to a novel and improved load levelling fluid spring and shock absorber unit which provides a smoother ride and automatically maintains a desired spacing of the vehicle from the running gear, regardless of variations in the load.

A spring and shock absorbing unit incorporating this invention is completely self-contained and includes means to adjust automatically the pressure of the unit to compensate for variations in the load on the vehicle supported thereby. This is accomplished without the requirement of external sources of pressure or external valving systems. The stroking of the unit occurring during the movement of the vehicle in normal operation is utilized to provide the necessary power for increasing the pressure of the unit to compensate for increased loads and automatic relief valving means are provided to maintain the desired pressure in the unit during operation or load changes thereon.

The shock absorbing spring units may be used as the sole spring and shock absorbing system of a vehicle or may be used in conjunction with other springs such as a mechanical spring. In either type of installation the unit adjusts for load changes on the vehicle.

It is an important object of the invention to provide a novel and improved self-contained fluid spring and damper unit incorporating means to adjust automatically for variations in the load applied thereto.

It is another important object of this invention to provide a novel and improved fluid spring incorporating means operable by the stroking thereof to replace automatically leakage from the spring.

It is another important object of this invention to provide a novel and improved fluid spring incorporating a self-contained pump and pressure controlling means operating automatically to maintain the proper pressure for the particular load supported by the spring.

It is still another object of this invention to provide a novel and improved air-oil spring damper having telescoping cylinder and piston elements each having bearings engaging the other element wherein the chamber between the bearings operates as a pump during the normal stroking of the spring to supply fluid under pressure to the spring maintaining the desired pressure charge therein.

It is still another object of this invention to provide a novel and improved unitary fluid spring incorporating pump means operated by the stroking of the spring to supply fluid under pressure thereto and relief means operable to release pressure from the spring when the pressure therein exceeds the proper pressure for the load supported by the spring.

Further objects and advantages will appear from the following description and drawings wherein.

Figures 1, 2:
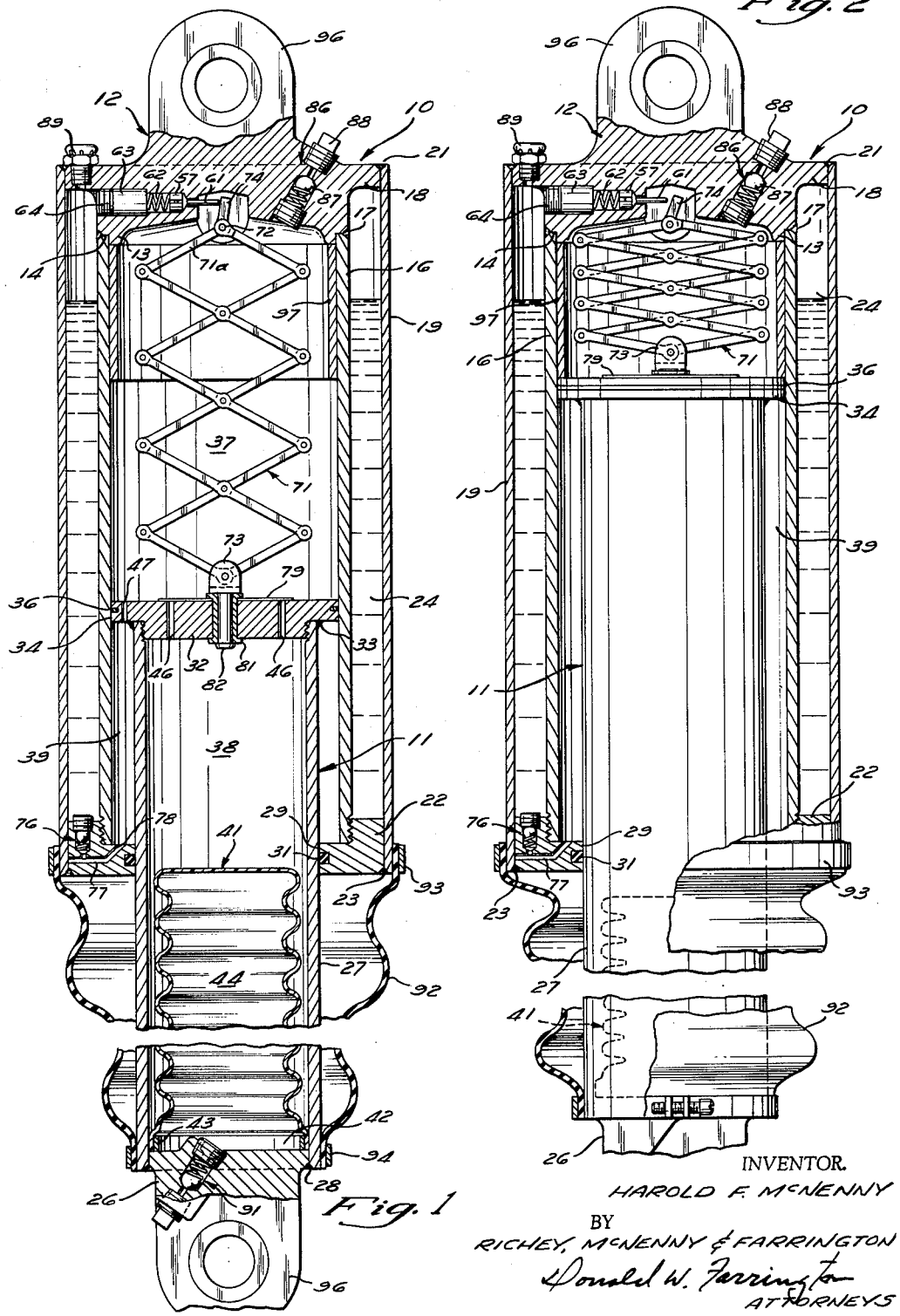
FIGURE 1 is a side elevation in longitudinal section illustrating the spring in the normal mid-position wherein the bleed valve operator engages the bleed valve.
FIGURE 2 is a view similar to FIGURE 1 illustrating the elements in the fully compressed position.

The illustrated embodiments of the invention include two basic assemblies, a cylinder assembly 10 and a piston assembly 11. The cylinder assembly 10 includes an end casting 12 formed with a circular axially extending lip 13 and a radial shoulder 14. A tubular cylinder element 16 is seated against the shoulder 14 and radially located by the lip 13. Permanent connection is provided therebetween by a weld 17. Upwardly from the weld 17, the end casting 12 is formed with a radially extending flange 18 closely fitting the inner wall of an outer sleeve 19. The sleeve 19 is welded to the flange 18 at 21 to form a permanent assembly. A bearing ring 22 is threaded onto the lower end of the cylinder 16 and is welded at 23 to the lower end of the outer sleeve 19. The weld 23 prevents the bearing ring 22 from rotating relative to the cylinder 16, thus resulting in a permanent assembly. The cylinder 16 and the outer sleeve 19 along with the flange 18 and bearing ring 22 cooperate to define an annular reservoir chamber 24 around the cylinder 16 which serves as a reservoir for liquid.

The piston assembly 11 includes an end casting 26 fitting into the lower end of a tubular piston element 27 and permanently attached thereto by a weld 28. The bearing ring 22 is formed with an inner bearing surface 29 closely fitting the outer surface of the piston element 27 and an O-ring seal 31 prevents fluid leakage therebetween.

Mounted at the upper end of the piston element 27 is an orifice plate 32 threaded into the open end of the piston element 27 and tack-welded at 33. The outer surface of the orifice plate 32 is formed with a bearing surface 34 closely fitting the inner wall of the cylinder element 16. The surface 34 may be provided with a suitable seal, such as a metallic ring seal 36 to reduce or substantially eliminate leakage along the surface of engagement between the inner wall of the cylinder element 16 and the bearing surface 34.

The cylinder assembly 10 and piston assembly 12 cooperate to define a main cavity divided into an upper chamber 37 and a lower chamber 38 by the orifice plate 32. The total volume of this cavity is reduced by telescoping movement of the assemblies 10 and 11 toward each other. Since the orifice plate 32 is on the piston assembly 11 the chamber 38 has a constant volume and the entire change in cavity volume occurs in the chamber 37. A pumping chamber 39 is defined by the outer wall of the piston element 27 and the inner wall of the cylinder element 16 in cooperation with the bearing ring 22 and orifice plate 32. The volume of the pumping chamber 39 is increased by telescoping upward movement of the piston assembly 16 relative to the cylinder assembly 10 and decreased by the opposite relative movement.

Located within the chamber 38 is a collapsible pressure bag 41 formed of suitable flexible material such as Mylar or synthetic rubber. The collapsible air bag is generally cylindrical having an open end 42 pressed into sealing engagement with the inner wall of the piston element 27 adjacent to the end casting 26 by a spring ring 43. Thus, the air bag 41 separates a compressed air chamber 44 within the air bag 41 from the remaining portions of the chamber 38.

The orifice plate 32 is formed with four orifices 46 connecting the chambers 37 and 38 and a single orifice 47 connecting the chamber 37 to the pump chamber 39. Therefore, when the piston assembly 11 is stationary relative to the cylinder assembly 10, the pressure in the three chambers 37, 38 and 39 is equalized by the connection through the orifices 46 and 47.

Figure 3:
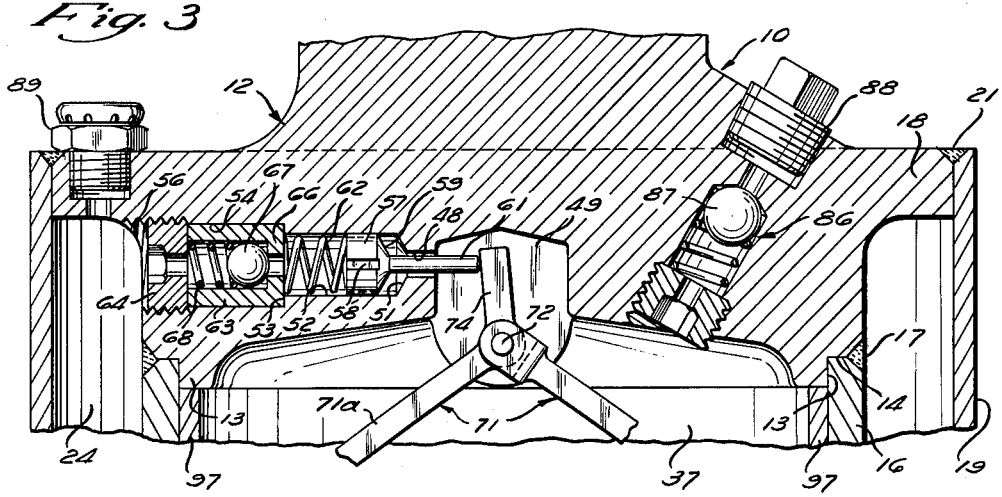
FIGURE 3 is an enlarged fragmentary section illustrating the structure of the bleed valving and charging fitting.
Figure 4:
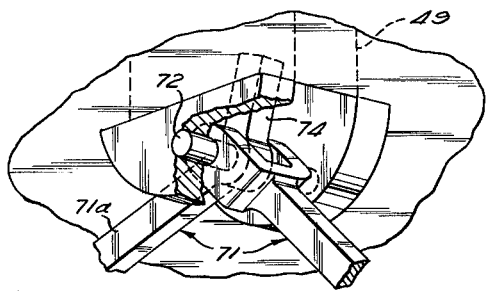
FIGURE 4 is a fragmentary perspective view of the upper mounting of the bleed valve operator.

Referring to FIGURE 3, the end casting 12 is formed with a first bore 48 open at its inner end to the recess 49 cast in the end casting 12 which defines the upper extremity of the chamber 37. The other end of the bore 48 opens to a conical valve seat 51 extending to a second coaxial larger diameter bore 52. The bore 52 extends to a radial shoulder 53 which joins the bore 52 with a third coaxial still larger diameter bore 54. The outer end of the bore 54 is threaded at 56 and is open to the annular chamber 24. A bleed valve 57 is located in the bore 52 and is centrally located therein by axially extending lands 58. The forward end of the bleed valve 57 is formed with a conical valving surface 59 adapted to seat against the valve seat 51 and prevent flow through the bores 48 and 52. An operating stem on the bleed valve 57 extends through the bore 48 and projects into the recess 49 for operation in a manner hereinafter described.

A spring 62 engages the rearward end of the bleed valve 57 urging it toward the valve seat 51 and normally maintaining the valve closed. The rearward end of the spring 62 is seated against a relief valve housing 63 located in the bore 54 and held against the shoulder 53 by a retainer nut 64. The inner end of the relief valve housing 63 is formed with an inwardly extending shoulder 66 forming a valve seat for a ball valve element 67. A spring 68 extends between the retainer nut 64 and the ball valve element 67 normally urging it into engagement with the seat defined by the shoulder 66. The ball valve 67 acts as a pressure relief valve which remains closed until a predetermined pressure occurs in the bore 52, such predetermined pressure being that pressure which overcomes the action of the spring 68 and moves the ball valve 67 away from its seat. Thus, the ball valve 67 is a pressure relief valve connected in series with and downstream from the bleed valve 57. Fluid therefore will not flow past the ball valve 67, even when the bleed valve 57 is open, unless the pressure in the chamber 37 exceeds the relief pressure of the valve 67.

In order to operate the bleed valve 57, at a predetermined point in the movement of the piston assembly 11 relative to the cylinder assembly 10, a parallelogram valve operating linkage 71 is provided which is connected between a pivot 72 on the end casting 12 and a swivel fitting 73 mounted on the orifice plate 32. As the piston assembly 11 moves upward into the cylinder assembly 10, the linkage 71 collapses to the position illustrated in FIGURE 2. Conversely, movement of the piston assembly downward out of the cylinder assembly causes the linkage to extend. Extension of the linkage 71 causes one of the links 71a at the pivot 72 to rotate in a counterclockwise direction around the pivot 72, while collapsing movement causes clockwise rotation of the link 71a. The various elements are proportioned so that a projection 74 on the link 71a engages the operating stem 61 when the piston assembly 11 reaches the normal mid-position shown in FIGURE 1 and opens the bleed valve 57 whenever the piston assembly 11 extends beyond the normal mid-position. On the other hand, when the piston assembly 11 moves upward beyond the normal mid-position toward the position of FIGURE 2, the projection 74 moves away from the operating stem 61 allowing the bleed valve 57 to remain closed.

Figure 6:
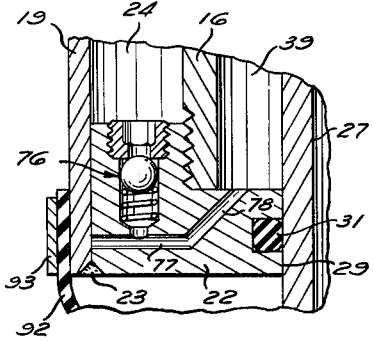
FIGURE 6 is an enlarged fragmentary section of the check valve connecting the oil reservoir with the pump chamber.

A check valve assembly 76 illustrated in FIGURE 6, is mounted in the bearing ring 22 and is connected through a pair of passages 77 and 78 to the pump chamber 39. The upstream end of the check valve 76 is open to the reservoir chamber 24. The check valve assembly 76 operates to prevent flow from the chamber 39 toward the chamber 24 but allows substantially unrestricted flow in the opposite direction whenever the pressure in the pump chamber 39 is lower than the pressure in the chamber 24.

Figure 5:
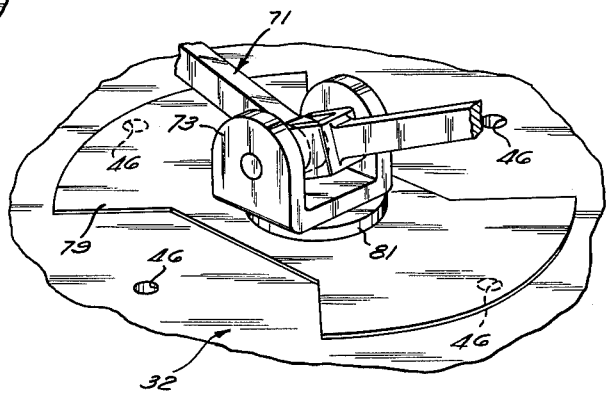
FIGURE 5 is an enlarged perspective fragmentary view of the lower mounting of the bleed valve operator.

Referring to FIGURE 5, a reed valve 79 is mounted against the upper surface of the orifice plate 32 by a hollow rivet 81 and is proportioned to cover two of the four orifices 46 at any given time. The reed valve 79 functions to close two of the orifices against flow from the chamber 37 toward the chamber 38 but permit substantially unrestricted flow through such orifices in the opposite direction. Therefore, the reed valve 79 which may be formed of spring copper or brass closes half of the orifices during compression of the spring but allows less restricted flow when the spring is extending.

The swivel fitting 73 extends through the hollow rivet 81 and is riveted at 82 as illustrated in FIGURE 1. The swivel fitting 73 permits relative rotation between the swivel fitting 73 and the piston assembly 11 to prevent winding up of the linkage 71 in the event that the piston assembly rotates relative to the cylinder assembly.

A charging fitting 86 is mounted in the end casting 12 open to the chamber 37. A back check valve 87 at the inner end of the charging fitting 86 permits liquid to be pumped into the chamber 37 and prevents leakage when the pump is disconnected before a plug 88 is inserted. A filler plug 89 is threaded into the end casting 12 open to the annular chamber 24. To maintain the chamber 24 at atmospheric pressure, the fitting 89 provides a vent which allows atmospheric air to enter or leave the chamber 24 but filters the air to eliminate the passage of dirt and the like. A second charging fitting 91 is provided in the end casting 26 open to the inside of the air bag to permit the charging of the air chamber with compressed air or other suitable gas. Here again, a check valve is provided to prevent leakaeg when the charging device is removed before the plug is installed.

A collapsible rubber boot 92 is fastened at its upper end around the bearing ring 22 by a clamp ring 93 and at its lower end around the end casting 26 by a clamp ring 94. The boot functions to keep the piston assembly 11 clean and prevent entry of dirt into the seal area. The two end castings 12 and 26 are provided with mounting bosses 96 so that the spring can be connected to the vehicle. A spacer sleeve 97 is positioned in the cylinder element 16 to closely fit the inner surface thereof and is proportioned to engage the end casting 12 and the orifice plate 32 when the piston assembly 11 moves to a fully compressed position of FIGURE 2 and limit further inward movement thereof. This provides a positive stop for compressing movement of the spring. The positive stop for extending movement is provided by the engagement of the orifice plate 32 with the bearing ring 22.

The air chamber 44 is charged to a pressure to support the minimum load of the vehicle on which the spring is to be mounted with the parts substantially in the mid-position as illustrated in FIGURE 1. To achieve this condition, the air chamber 44 is charged through the fitting 91 and the liquid chamber 37 is charged through the fitting 86. The chamber 24 is filled to the level illustrated in FIGURE 1 by removing the fiitting 89.

The relief valve 67 is urged toward its seated position by the spring 68 with sufficient force to remain seated until the pressure in the bore 52 exceeds the pressure required to support the minimum design load at the normal mid-position. Therefore, extension of the spring beyond the position of FIGURE 1 will open the bleed valve 57 but the relief valve 67 will prevent bleeding of the chamber 37 unless the pressure in the chamber 37 exceeds the minimum design pressure.

As the vehicle moves over the roadway, the spring strokes due to the roughness of the road surface. This stroking of the spring causes the pumping chamber 39 to increase in volume each time a piston assembly 11 moves inward toward the compressed position. The increase of volume of the pumping chamber 39 decreases the pressure therein causing liquid to flow through the orifice 47. However, the orifice 47 does not provide sufficient capacity under rapid movement of the piston assembly to maintain pressure in the pumping chamber 39. Therefore, a vacuum is created causing the check valve 76 to open allowing liquid to flow from the reservoir chamber 24 into the pumping chamber 39. As the piston assembly 11 again extends, the check valve 76 seats and the liquid is forced through the orifice 47 into the chamber 37. Thus, the stroking of the spring under operating conditions of the vehicle, causes liquid to be pumped from the reservoir chamber 24 to the pumping chamber 39 and into the main chamber 37. A check valve can be substituted for the orifice 47 when more positive pumping is required. The orifice 47 is however preferred since it is simple in structure and operates to reduce pumping efficiency as the pressure builds up in the spring thereby tending to automatically prevent over-pressure. Also, the resistance to flow of fluid through the orifice 47 during extension of the spring produces dampening to resist such extension.

When the spring is either compressing or extending very slowly or is statically supporting the load, the pressures in the three chambers 37, 38 and 39 are equalized by flow through the orifices 46 and 47. Therefore, the fluid under pressure produces an extending force which is equal to the pressure times the effective area within the seal 31. The spring rate under such conditions is, therefore, a function of the relationship between the pressure and volume of the gas in the chamber 44 and the area within the seal. The effective spring rate during rapid compression of the spring, however, is higher since the pressure in the pumping chamber drops due to such spring compression causing the effective area of the fluid under pressure to be equal to the area within the cylinder element 16. This larger effective area results in a higher spring rate under such conditions of rapid compression.

If pumping were to continue without relief, the spring would become over-pressurized. Such over-pressure of the spring by the pumping action would cause the spring to move to the fully extended position were it not for the bleed valve 57 and pressure regulating valve 67.

If the pressure occurring is such that the spring moves toward the extended position beyond the mid-position of FIGURE 1, the projection 74 engages the operating stem 61 of the bleed valve 57 opening the bleed valve allowing the liquid in the chamber 37 to bleed past the bleed valve into the bore 52. If the pressure in the chamber 37 is above the relief pressure of the relief valve 67, the relief valve opens allowing the pressurized liquid to be exhausted into the reservoir chamber 24. Since the relief valve 67 is constructed so that it will prevent exhaust of liquid when the pressure in the chamber 37 is at or below the pressure required to properly support the substantially empty vehicle in the mid-position, only excessive pressure caused by the pumping will be relieved.

The pumping action of the chamber 39 and the bleeding action of the bleed valve 57 and pressure relief valve 67 cooperate to regulate the pressure in the chamber 37 so that the load supported by the vehicle will be maintained substantially at the normal mid-position of FIGURE 1.

If the load in the vehicle is increased, the spring compresses below the mid-position of FIGURE 1 toward the position of FIGURE 2. The stroking of the spring, however, pumps liquid from the reservoir 24 through the pumping chamber into the chambers 37 and 38. Since the spring is compressed beyond the mid-position, during this action, the bleed valve 57 does not open and the pressure in the chambers 37 and 38 increases until the required pressure to maintain the new load is achieved. When this occurs, the bleed valve 57 cooperates with the pump to regulate the pressure at the new required pressure.

If the load on the vehicle is then decreased, the spring moves toward the extended position opening the bleed valve and allowing the pressure in the chambers 37 and 38 to drop until the mid-position is again reached. Therefore, the spring functions to provide the required pressure regardless of the changes in load on the vehicle.

Any leakage which escapes past the seal 31 is automatically replaced by the pumping action since the required pressures in the two chambers 37 and 38 is always maintained so long as liquid is present in the reservoir chamber 24.

Figure 7:
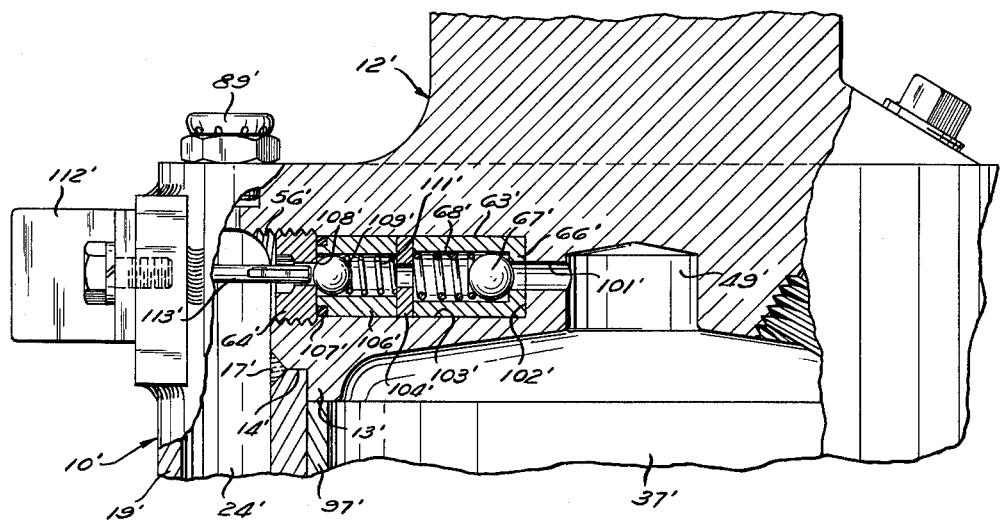
FIGURE 7 is an enlarged fragmentary view of the bleed valving structure of a second embodiment of this invention.
Figure 8:
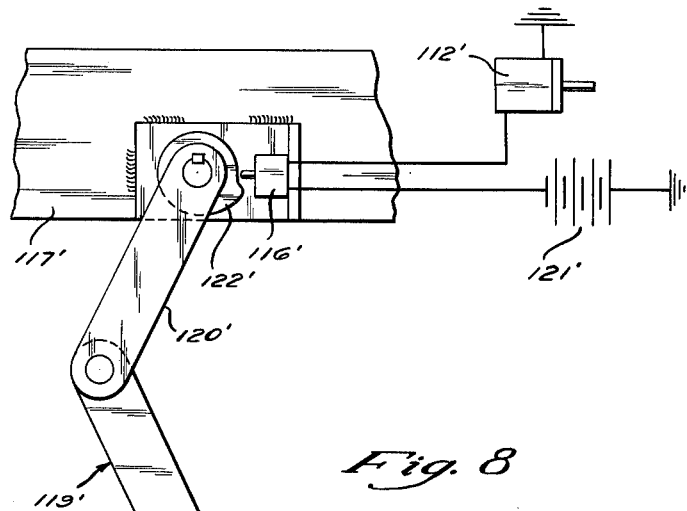
FIGURE 8 is a schematic illustration of an installation of the spring incorporating the second embodiment of this invention.

In FIGURES 7 and 8, a second embodiment of this invention is illustrated. Considerable similarity between the physical structure of the first and second embodiment is present so similar reference numerals with a prime (′) added is used to indicate similar parts with the prime indicating that the reference is made to the second embodiment.

In the second embodiment, the internal bleed valve operating mechanism is eliminated and an external mechanism is used for this purpose. The general function of the second embodiment spring is substantially identical to that of the first embodiment spring but a solenoid is used to open the bleed valve whenever the spring extends beyond its normal mid-position. The cylinder assembly 10′ is provided with an end casting 12′ formed with a first bore 101′ open to the recess 49′ in the end casting 12′. The bore 101′ is joined by a shoulder 102′ to a second coaxial larger diameter bore 103′ threaded at its outer end at 56′. Mounted within the bore 103′ against the shoulder 102′ is a relief valve housing 63′ formed with an inturned shoulder 66′ defining a valve seat. A ball valve 67′ is held against the shoulder 66′ by a spring 68′. The spring is seated against a spacer 104′ by a check valve sleeve 106′ and a retainer nut 64′. A seal 107′ engages the sleeve 106′, retainer nut 64′ and the bore 103′ to prevent leakage around the valve.

The retainer nut 64′ is formed with a throughbore defining a valve seat 108′ against which a ball check valve 109′ is seated by a spring 111′.

In order to move the check valve 109′ off the seat 108′ against the action of the fluid under pressure and the spring 111′, a solenoid operator 112′ is bolted onto the outside of the cylinder assembly 10′ and is provided with a push rod 113′ which extends through the retainer nut 64′ and lifts the check valve 109′ off the seat 108′ when the solenoid 112′ is energized.

The check valve element 109′ prevents flow of fluid from the upper chamber 37′ to the reservoir chamber 24′ whenever the solenoid 112′ is deenergized. However, when the solenoid 112′ is energized, the check valve 109′ is open to allow bleeding flow from the upper chamber 37′ provided the pressure contained within the upper chamber 37′ is sufficient to overcome the action of the spring 68′ and lift the relief valve element 67′ away from its seat. Since the relief valve and the solenoid operated check valve are in series, both must open before bleeding from the chamber 37′ can occur.

Referring to FIGURE 8, the solenoid 112′ is operated by a switch 116 which is mechanically closed whenever the spring is compressed to the normal mid-position. The switch 116′ is connected to the solenoid 112′ and the battery 121 of the electrical system of the vehicle. A pair of pivoted members 119′ and 120′ are connected between the axle housing 118′ and vehicle frame 117′ so that as the upper member 120′ rotates in a counterclockwise direction relative to the frame whenever the axle housing 118′ moves downward. A cam 122′ on the member 120′ is proportioned to engage the operator of the switch 116′ closing the switch whenever the axle and housing 118′ moves downward with respect to the frame beyond the position it assumes when the spring extends to its normal mid-position. The spring has not been illustrated in FIGURE 8 for purposes of simplification but it should be understood that the spring would be operatively connected between the frame 117′ and the axle housing 118′ so that the axle housing position is a function of the spring position.

The second embodiment of FIGURES 7 and 8 differs principally from the first embodiment of FIGURES 1 through 6 in that external electrical means are provided to sense the spring position and open the bleed valve when the spring extends beyond the normal mid-position. It should be understood that the linkage of FIGURE 8 is only one mechanism for operating the switch 116' and that the particular arrangement used is determined by the existing suspension structure of the vehicle. The switch of this embodiment may be mounted to be operated by an existing link in the wheel suspension system which moves in a manner directly related to the degree of compression of the spring. If desired, a mechanically operated bleed valve having an external operator instead of a solenoid can be operated by external linkage means arranged to open the valve when the spring extends beyond its normal mid-position. Still further, an internal operating linkage, similar to the linkage of the embodiment of FIGURES 1 to 6 may be used to operate an internal switch connected to energize a solenoid valve of the type illustrated in FIGURE 7.

The spring incorporating this invention operates to automatically adjust for the load supported. If increased loading is applied to the spring, the pressure of the spring is automatically increased to the required pressure to maintain the load. On the other hand, if the load is decreased, the spring automatically is depressurized to the pressure required to properly support the load. Since a substantial volume is present in the reservoir chamber 24, substantial amounts of leakage can occur without causing failure of the spring. Because the reservoir chamber 24 is around the cylinder 16, a substantial volume of reservoir is provided without substantially increasing the diameter of the unit. The bleed valve 57 is located at the top of the chamber 37 so that air cannot be trapped in the chamber 37.

Although preferred embodiments of this invention are illustrated, it is to be understood that various modifications and rearrangements of parts may be resorted to without departing from the scope of the invention as defined in the following claims.

I claim:

1. A fluid spring comprising a pair of telescoping assemblies cooperating to define a cavity the volume of which is changed by telescoping movement of said assemblies, a fluid under pressure in said cavity urging said members in a direction causing an increase in volume of said cavity, pumping means powered by relative movement of said assemblies to pump fluid under pressure into said cavity, said pumping means having a pumping efficiency which increases with increasing velocity of relative movement between said assemblies and which decreases with increased pressure in said cavity, bleed means operable by movement of said assemblies in said direction beyond a predetermined relative position to release fluid from said cavity only when the pressure in said cavity exceeds a predetermined minimum pressure.

2. A fluid spring comprising a pair of telescoping assemblies cooperating to define a main fluid cavity the volume of which is reduced by relative telescoping movement and a separate pumping chamber the volume of which is increased by such relative telescoping movement, a compressible fluid in said main cavity causing pressure in said cavity operating to resiliently urge said assemblies apart, a normally closed first valve allowing fluid to flow into said pumping chamber only when the pressure therein reaches a predetermined minimum presure, an open orifice connecting said main cavity and pumping chamber controlling the rate of flow therebetween in both directions to a function of the differential pressure across said orifice, and bleed valve means connected to bleed fluid from said main cavity when said assemblies extend beyond a predetermined position.

3. A fluid spring for resiliently resisting a variable load comprising a cylinder assembly, a piston assembly telescoping into said cylinder assembly and cooperating therewith to define a main cavity, the volume of which is reduced by telescoping movement between said assemblies, a pumping chamber around said piston assembly and within said cylinder assembly the volume of which is increased by such telescoping movement between said assemblies, liquid filling a portion of said main cavity, compressed gas filling the remaining portions of said main cavity and pressurizing said liquid thereby producing a force resiliently urging said assemblies apart against the action of said load, a reservoir on said cylinder assembly, a check valve connecting said reservoir and pumping chamber allowing flow to the latter only when the pressure therein is less than the pressure of said reservoir, an open orifice connecting said pumping chamber and main cavity, and means preventing pressures in said cavity in excess of the pressure operable to maintain said assemblies in a predetermined position against the action of said load.

4. A fluid spring comprising a cylinder assembly, a piston assembly telescoping into said cylinder assembly and cooperating therewith to define a main cavity, the volume of which is reduced by telescoping movement between said assemblies, a pumping chamber around said piston assembly and within said cylinder assembly the volume of which is increased by such telescoping movement between said assemblies, liquid filling a portion of said main cavity, compressed gas filling the remaining portions of said main cavity and pressurizing said liquid thereby producing a force resiliently urging said assemblies apart, a reservoir on said cylinder assembly, a check valve connecting said reservoir and pumping chamber allowing flow to the latter only when the pressure therein is less than the pressure of said reservoir, an open orifice connecting said pumping chamber and main cavity, and means connecting said main cavity and reservoir allowing flow to the latter only when said assembly is extended beyond a predetermined position and the pressure in said main cavity exceeds a predetermined minimum pressure.

5. A fluid spring comprising a cylinder, a piston telescoping into said cylinder cooperating therewith to define a variable volume cavity and a separate variable volume pumping chamber, the volume of said cavity decreasing and the volume of said pumping chamber increasing when said piston moves in a direction into said cylinder, a reservoir carried by said cylinder at atmospheric pressure, liquid in said reservoir, said pumping chamber and a portion of said cavity, compressed gas filling the remaining portion of said cavity, a check valve connecting said reservoir and pumping chamber allowing liquid flow only toward said pumping chamber, a restricted orifice connecting said pumping chamber and cavity equalizing the pressure therein under static conditions, a passage connecting said cavity and said reservoir, a normally closed positive sealing valve in said passage, and means opening said normally closed valve when said piston moves out of said cylinder beyond a predetermined position.

6. A fluid spring for vehicle suspension comprising a cylinder assembly, a piston assembly extending into said cylinder assembly, an orifice plate carried by one of said assemblies, said assemblies cooperating to define a variable volume cavity the total volume of which is reduced by movement of said piston assembly toward said cylinder assembly, said orifice plate dividing said cavity into first and second chambers, a first orifice in said orifice plate providing a restricted flow connection between said first and second chambers, a sealing ring on said cylinder assembly engaging said piston assembly and cooperating with said assemblies and orifice plate to define a pumping chamber the volume of which is increased by movement of said piston assembly in a direction toward said cylinder assembly, an annular liquid reservoir around said cylinder assembly extending at one end to said sealing ring, a vent maintaining said reservoir at atmospheric pressure, a check valve at said sealing ring connecting said reservoir and said pumping chamber for flow only in a direction towards said pumping chamber, a second orifice in said orifice plate providing a restricted flow connection between said pumping chamber and said cavity, a bleed valve in said cylinder assembly open to said main cavity, a relief valve in said cylinder assembly connecting said reservoir and bleed valve for flow only when the pressure between said bleed valve and relief valve exceeds a predetermined pressure, liquid filling a portion of said cavity, gas under pressure filling the remaining portion of said cavity, and means connected between said cylinder and piston assemblies operable to open said bleed valve when said piston assembly moves away from said cylinder assembly beyond a predetermined position.

7. A fluid spring for vehicle suspension comprising a cylinder assembly, a piston assembly extending into said cylinder assembly, an orifice plate on said piston assembly, said assemblies cooperating to define a variable volume cavity the total volume of which is reduced by movement of said piston assembly toward said cylinder assembly, said orifice plate carried by said piston assembly dividing said cavity into first and second chambers, a first orifice in said orifice plate providing a restricted flow connection between said first and second chambers, a sealing ring on said cylinder assembly engaging said piston assembly and cooperating with said assemblies and orifice plate to define a pumping chamber the volume of which is increased by movement of said piston assembly in a direction toward said cylinder assembly, an annular liquid reservoir around said cylinder assembly extending at one end to said sealing ring, a vent maintaining said reservoir at atmospheric pressure, a check valve at said sealing ring connecting said reservoir and said pumping chamber for flow only in a direction towards said pumping chamber, a second orifice in said orifice plate providing a restricted flow connection between said pumping chamber and said cavity, a positively sealing normally closed bleed valve in said cylinder assembly open to the upper portion of said main cavity, a relief valve in said cylinder assembly connecting said reservoir and bleed valve for flow only when the pressure between said bleed valve and relief valve exceeds a predetermined pressure, liquid filling a portion of said cavity, gas under pressure filling the remaining portion of said cavity, pressure transmitting means on said piston assembly separating said gas from said liquid, and means connected between said cylinder and piston assemblies operable to open said bleed valve when said piston assembly moves away from said cylinder assembly beyond a predetermined position.

References Cited by the Examiner

UNITED STATES PATENTS

| | | | |
|---|---|---|---|
| 727,503 | 5/1903 | Walker | 137—430 |
| 1,439,417 | 12/1922 | Holmes. | |
| 2,294,918 | 9/1942 | Levy. | |
| 2,308,404 | 1/1943 | Thornhill | 267—64 |
| 2,372,023 | 3/1945 | Schnell | 267—64 |
| 2,436,573 | 2/1948 | Heynes. | |
| 2,769,632 | 11/1956 | De Carbon | 267—64 |
| 2,802,664 | 8/1957 | Jackson. | |
| 2,921,160 | 1/1960 | Lautzenhiser. | |
| 3,033,556 | 5/1962 | Wossner. | |
| 3,036,844 | 5/1962 | Vogel. | |
| 3,064,995 | 11/1962 | Weller. | |
| 3,079,171 | 2/1963 | Dickinson. | |
| 3,083,026 | 3/1963 | Broadwell. | |
| 3,128,088 | 4/1964 | Paschakarnis. | |

FOREIGN PATENTS

| | | |
|---|---|---|
| 194,737 | 3/1923 | Great Britain. |
| 869,132 | 5/1961 | Great Britain. |
| 933,358 | 8/1963 | Great Britain. |

EUGENE G. BOTZ, *Primary Examiner.*

ARTHUR L. LA POINT, *Examiner.*